United States Patent
Bowes, Jr.

[11] Patent Number: 6,092,707
[45] Date of Patent: Jul. 25, 2000

[54] SHOCK AND WEATHER PROTECTIVE MOBILE TELEPHONE CASE

[76] Inventor: James Bowes, Jr., P.O. Box 1268, Marblehead, Mass. 01945

[21] Appl. No.: 08/936,697

[22] Filed: Sep. 24, 1997

Related U.S. Application Data

[60] Provisional application No. 60/037,936, Feb. 14, 1997.
[51] Int. Cl.⁷ ........................................ B62J 11/00
[52] U.S. Cl. .................. 224/435; 224/431; 224/929; 206/320; 206/523
[58] Field of Search ...................... 224/428, 430, 224/431, 433, 435, 414, 412, 440, 441, 451–456, 457, 459–462, 148.3, 929; 206/523, 305, 320, 372

[56] References Cited

U.S. PATENT DOCUMENTS

| | | | |
|---|---|---|---|
| 3,263,806 | 8/1966 | Ring | 224/148.3 |
| 3,578,199 | 5/1971 | Duncan | 224/148.3 |
| 3,777,882 | 12/1973 | McIntyre | 206/372 |
| 3,904,058 | 9/1975 | Rosenstein | 206/523 |
| 4,193,525 | 3/1980 | Sommers | 224/435 |
| 4,836,374 | 6/1989 | Hutchins et al. | 206/523 |
| 4,865,186 | 9/1989 | Gates . | |
| 5,016,749 | 5/1991 | Raye . | |
| 5,114,060 | 5/1992 | Boyer | 224/435 |
| 5,159,712 | 10/1992 | Schneider et al. | 224/929 |
| 5,178,308 | 1/1993 | Endre . | |
| 5,251,777 | 10/1993 | McMahon | 224/433 |
| 5,320,223 | 6/1994 | Allen | 206/523 |
| 5,388,691 | 2/1995 | White . | |
| 5,417,327 | 5/1995 | Saumure | 224/148.3 |

OTHER PUBLICATIONS

Allied Bicycle Tool Set in water bottle case; model 69090, 1996.

*Primary Examiner*—Gregory M. Vidovich

[57] ABSTRACT

A shock and weather protective telephone case, composed of two separate halves which when mated together form a hollow cylinder with capped ends. A mobile telephone or other similarly sized equipment is protected by placing it within the cylinder. The body of the case includes an indentation to secure the case to a standard bicycle water bottle holder. The case provides a waterproof seal with which to protect the contents. Foam inserts are located on the internal walls of the cylinder to secure and protect the contents from shock and also allow acoustical clearance.

6 Claims, 15 Drawing Sheets

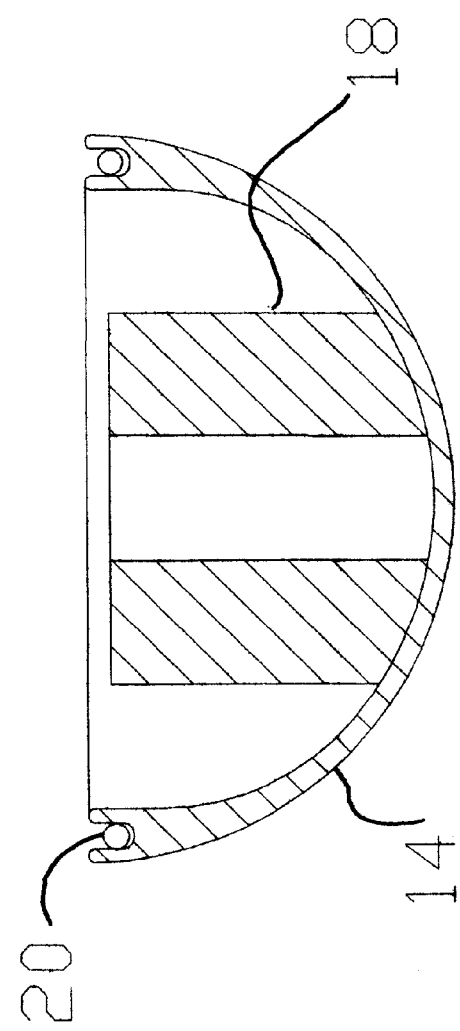

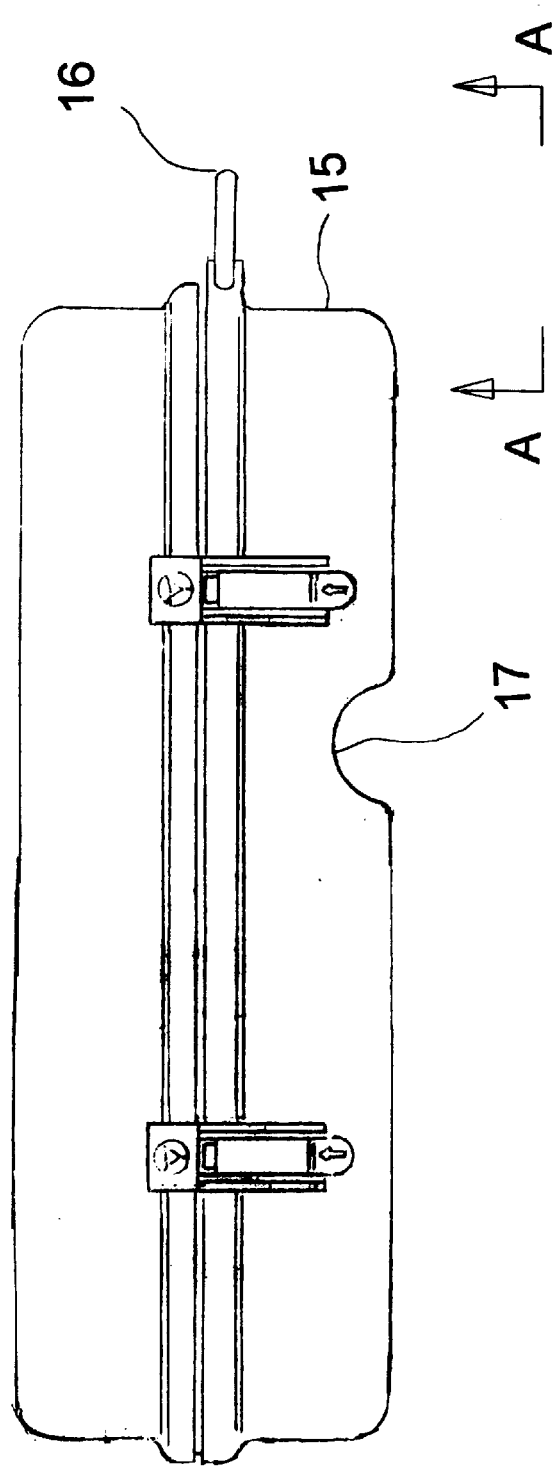

SHOCK AND WEATHER PROTECTIVE MOBILE TELEPHONE CASE

RELATED APPLICATIONS

Priority is claimed to Provisional Patent Application No. 60/037,936, filed on Feb. 14, 1997.

BACKGROUND

This invention relates to protective cases for fragile equipment including but not limited to mobile/wireless telephones, radios, pagers, computers, navigation systems, etc.

In recent years the use of cellular and mobile telephones for non business related uses has increased dramatically. In the past the size of the phones has limited the carrying and general mobility of these wireless telephones to large carrying cases and automobiles. Continuing improvement in the art has led to smaller phones which are carried by people without the aid of large bags or automobiles. Currently a large variety of soft leather cases are available to protect the fragile electronics of the wireless telephones. These leather cases provide a limited amount of protection to the telephone. They do not protect the telephone from severe shock damage or damage caused by water or weather.

As people become more reliant on the convenience and safety provided by having wireless telephones with them they are starting to take these phones places were they normally would not have when the phones were bigger.

An increasingly popular activity for a wide variety of people is bicycle riding. Many people who actively partake in recreational and sport bicycling are also owners of wireless telephones. No previous equipment exists that provides a convenient and safe method of carrying a wireless telephone on a bicycle. People want to take their wireless telephones on their bicycling trips in order to maintain necessary communications and as a safety aid in case something goes awry during their trip.

A few solutions have been suggested for taking a wireless telephone along while bicycling.

(a). Wearing the Telephone using the Belt Hook found on a Soft Leather Case

This solution exposes the telephone to any foul weather that may occur. It also does not protect the telephone from shock damage if the owner happens to drop it while cycling or protect the telephone during a crash involving the cyclist. This solution is often uncomfortable to the cyclist. The clothing designed for cycling often uses elastic waistbands instead of belts, which the belt hook on the leather case is designed to attach.

(b). Putting the Telephone in a Backpack or Bike Mounted Bag

This solution does not protect the telephone from severe shock. This solution also puts the telephone in a position where its use is difficult. Hearing the telephone ring while in a backpack or bag is difficult. Retrieving the telephone quickly is made difficult by the other items in the bag. Also, the telephone takes up space in the bag that might be better utilized by other objects.

Further, the telephone is most often needed in situations described above where it is also most likely to be damaged. These situation include a crash or significant rain, cold, or heat. Another class of sports that is becoming more popular is recreational boating in small boats such as canoes, kayaks, and sailboats. These activities present many of the same needs for telephone use and demands upon its protection. In addition, the environment is always wet.

Thus, with the increasing popularity of both the use of wireless telephones and sports such as bicycling and small boating, and the lack of any known means for conveniently holding the wireless telephone to a bicycle frame utilizing a standard water bottle holder, the invention was developed.

OBJECTS AND ADVANTAGES

Several objects and advantages of the present invention are:

(a) to provide a case which utilizes a standard bicycle water bottle cage to mount directly and unobtrusively to a bicycle;

(b) to provide a case which provides shock protection to a wireless telephone or other similar equipment;

(c) to provide a case which provides a waterproof seal to protect a wireless telephone or other similar equipment from damage caused by weather or water;

(d) to provide a case which provides easy access while cycling or boating:

(e) to provide a case which allows the hearing of a telephone ringer, pager, etc;

(f) to provide a case which easily accepts a carry strap to allow for use while not on a bicycle or boat;

(g) to provide a case which fits a variety of different sizes and styles of wireless telephones or other similar equipment;

(h) to provide a case whose outside shell can be used as an advertising media;

(i) to provide a case which can be marked with instructions on how to operate a wireless telephone or other similar equipment;

(j) to provide a case which will float if dropped or placed in water while still protecting the contents.

Still further objects and advantages will become apparent from a consideration of the ensuing description and drawings.

DRAWING FIGURES

FIG. 4A is a cross sectional view of a protective foam insert in one of the halves of the case.

FIG. 5 is a side view of a protective equipment case showing the positioning of a D-hook.

REFERENCE NUMERALS IN DRAWINGS

10 Shock and Weather Protective Equipment Case
11 Standard Bicycle Water Bottle Cage
12 Bicycle Frame Down Tube
13 Snap Closure Assembly
14 Front Half of Case
15 Rear Half of Case
16 D-Hook
17 Indentation in Rear of Case
18 Protective Foam
19 Hinge
20 O-Ring
21 Wireless Telephone
22 Bicycle
23 Bicycle Frame Seat Tube
24 Cylinder
25 Hinged Cap
26 Boat
27 Foam Insert
28 Threaded Cylinder
29 Threaded Cap
30 Bottom Hinged Embodiment (Top)
31 Bottom Hinged Embodiment (Bottom)
32 Split Cylinder (Top)
33 Split Cylinder (Bottom)
34 Strap Mounted Case
35 Strap
36 Screw Mounted Case
37 Screw
38 Hinge

DETAILED DESCRIPTION

Figure 1:
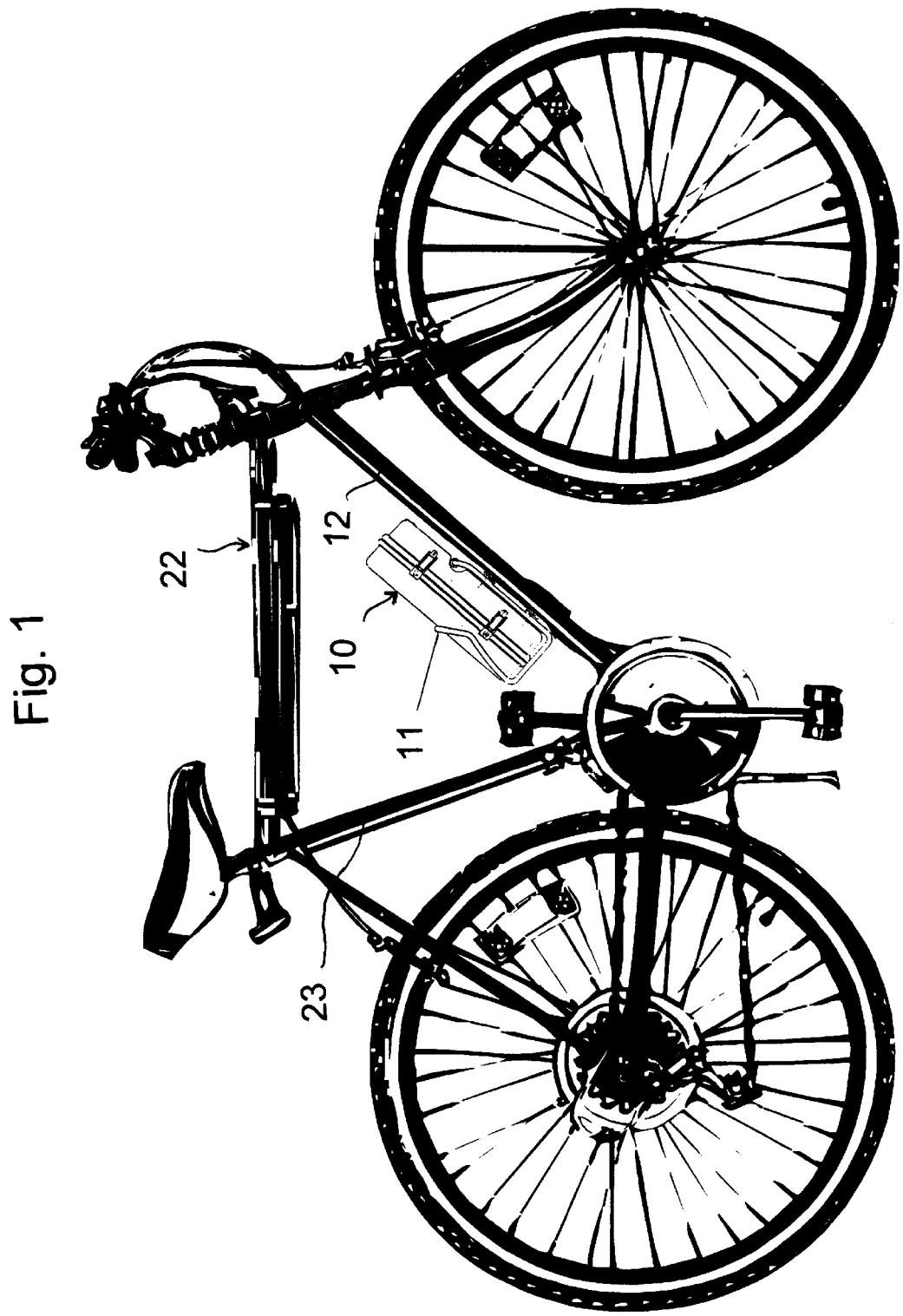
FIG. 1 is a general view of a bicycle with a protective equipment case mounted to a bicycle via a standard bicycle water bottle cage.
Figure 2:
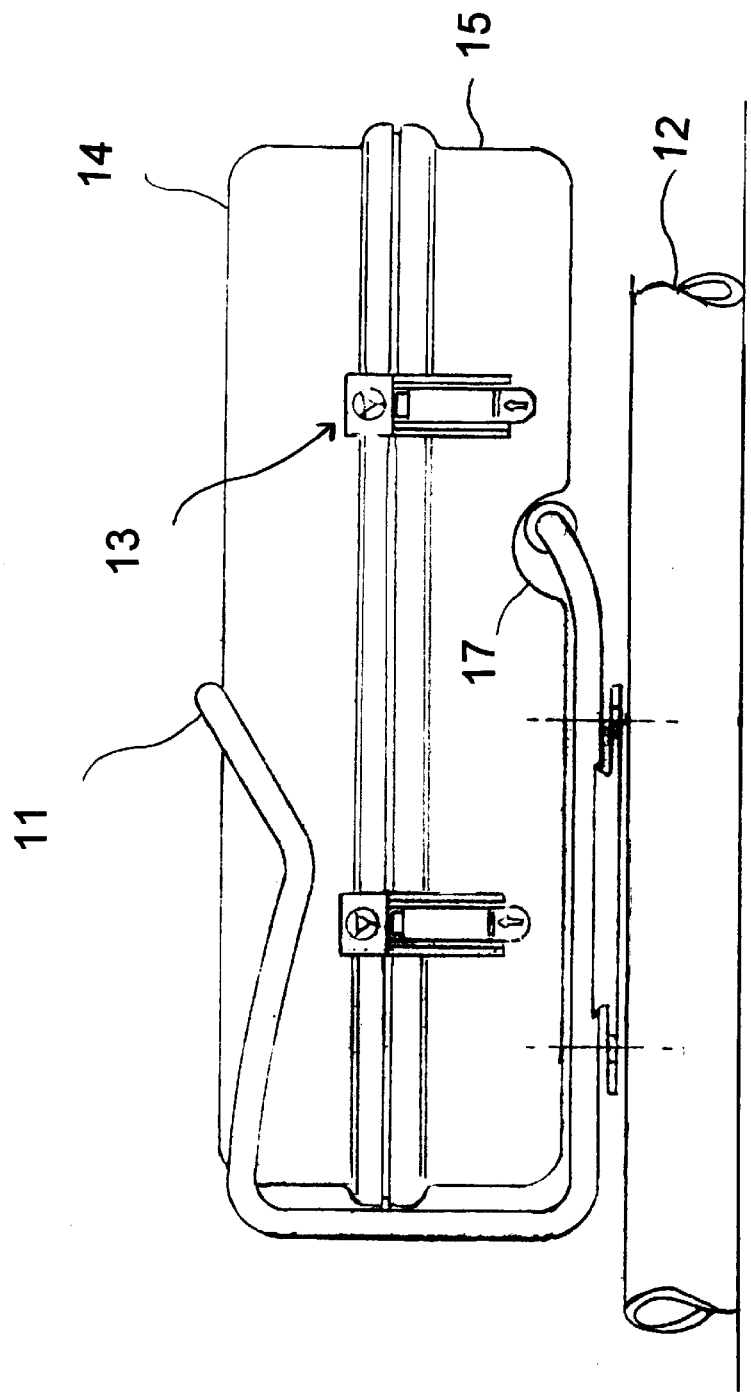
FIG. 2 is an enlarged view showing a protective equipment case installed to a standard water bottle cage.

FIG 1, shows an embodiment of the protective equipment case 10 held in a holder or standard water bottle cage 11 which is mounted to the down tube frame member 12 of a bicycle 22. The protective equipment case 10 secures to the standard water bottle cage 11 by means of indention 17 (FIG. 2). The protective equipment case 10 easily snaps in and out of standard water bottle cage 11, and is located on the down tube frame member 12 to allow easy access while the operator is on the bicycle. The operator does not have to dismount the bicycle to access the protective telephone case. It may also be mounted on the seat tube 23, behind the seat, on the handlebars, or any other place a water bottle may be secured.

Standard water bottle holder 11 (see FIG. 1) is an example of the commonly available means for holding a water bottle to a bicycle. The water bottle holder includes a base support for supporting the base of the bottle, a first support which resiliently engages an indentation on the bottle on one side thereof, and a second support that engages the other side of the water bottle for holding the water bottle therein.

A more detailed view of the protective equipment case is provided in FIG. 2. The protective case is composed of two separate halves 14,15, which when mated together form a hollow cylinder with capped ends. The outer diameter of the cylinder is designed to be compatible with standard bicycle water bottle cage 11. The rear half of the case 15 has an indentation 17, properly placed to allow a secure and snug fit into standard bicycle water bottle cage 11. Snap closures 13 are used to securely latch the front half of the case 14 with the rear half of the case 15.

Figure 3:
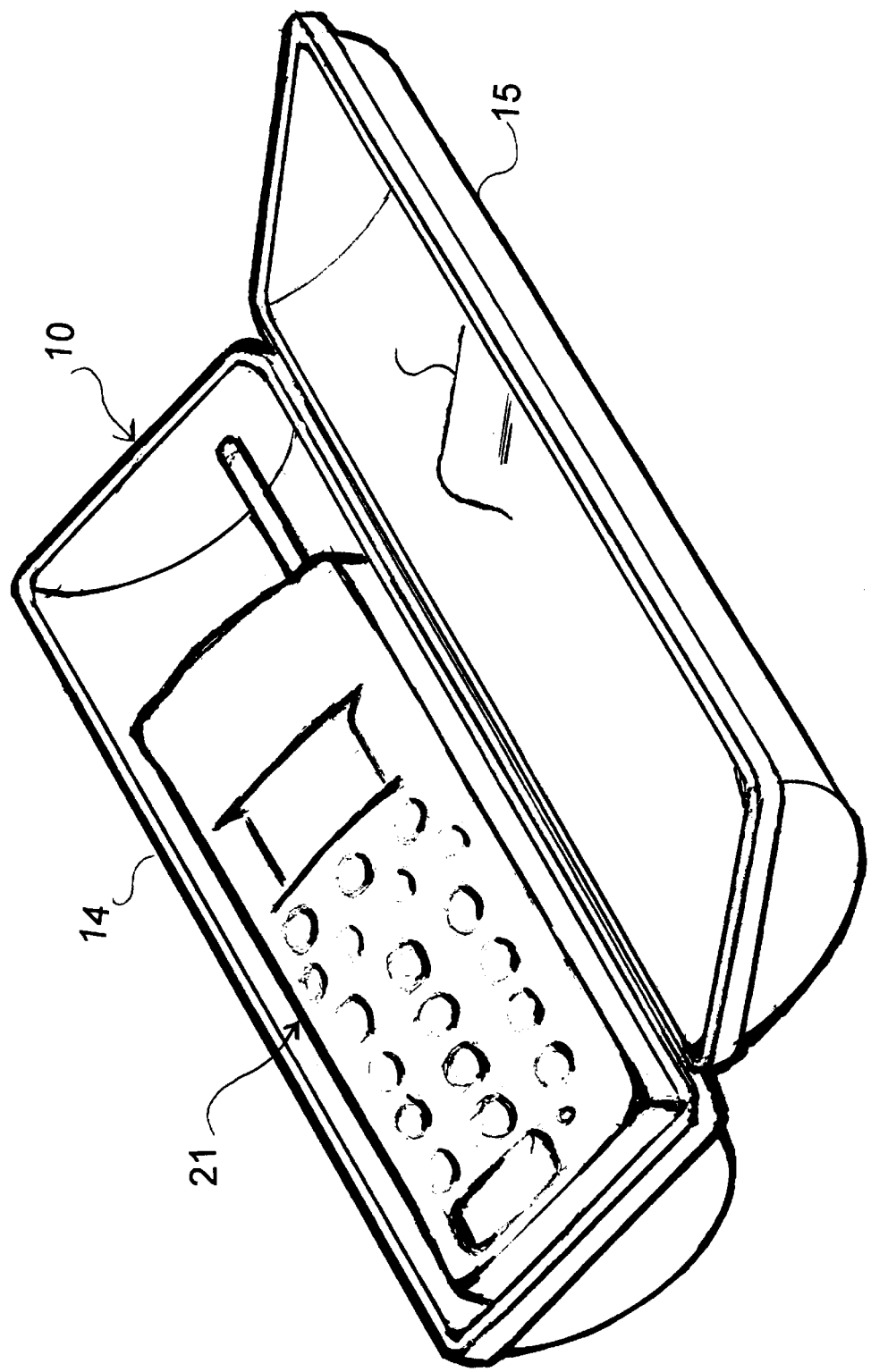
FIG. 3 is a protective case in the open position, with a wireless telephone resting inside the case.

FIG. 3 shows the embodiment of the protective equipment case 10 in the open position containing a wireless telephone 21. The wireless telephone is placed inside the hollow openings of halves 14,15. The protective case is then sealed by means of folding the unit together along hinge 19 (FIG. 4) which connects the two halves. The case is sealed shut by use of snap closures 13 which are located on the side opposing hinge 19. The protective foam inserts 18 (FIG. 4) are omitted FIG. 3 to allow an internal view of the indentation.

The perimeter of the two mating halves is sealed by means of O-ring 20

Figure 4:
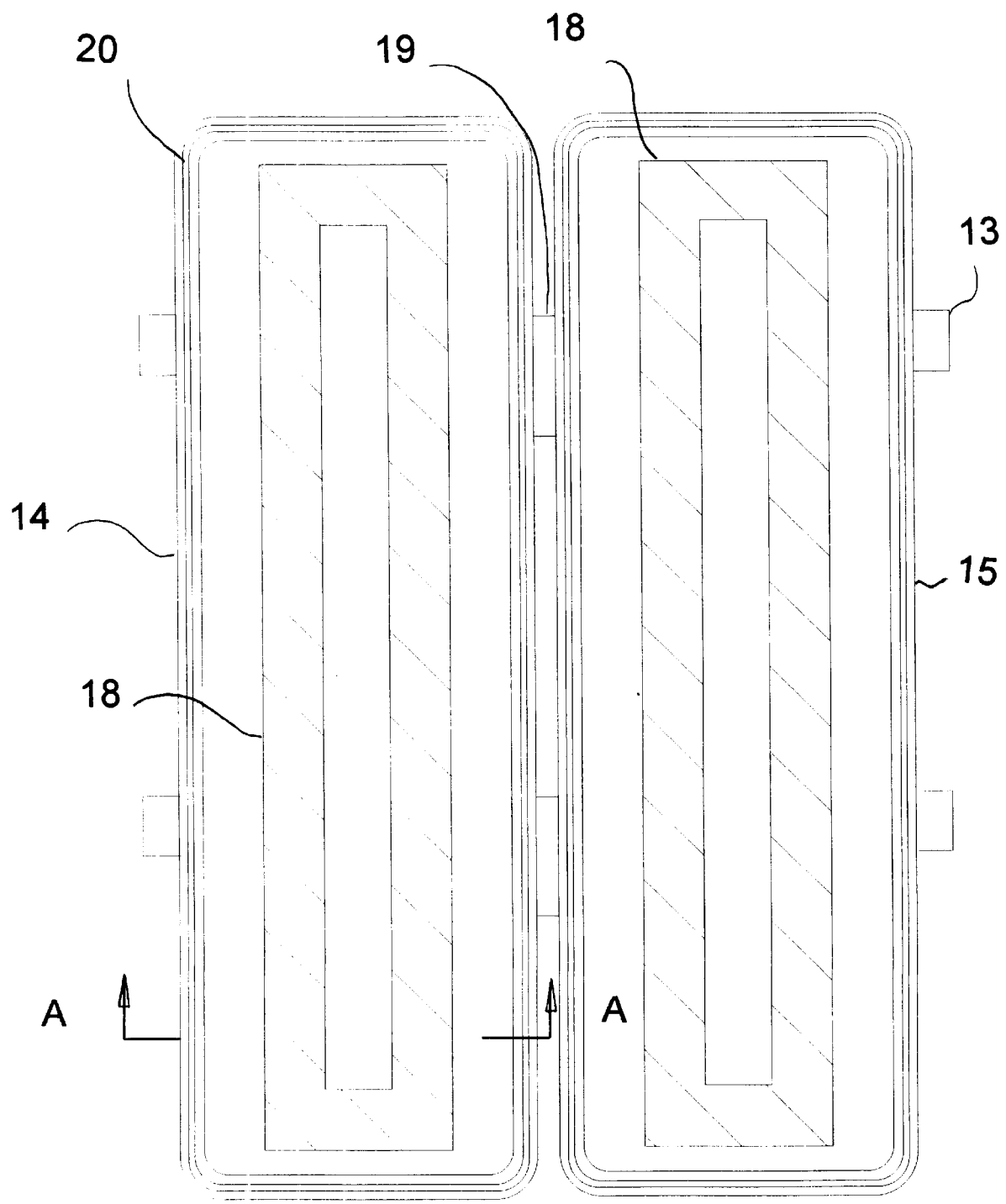
FIG. 4 is a view of protective foam inserts within the case.

The protective foam 18 shown in FIG. 4 has two main functions. The first function is to protect the contents of the protective case from any shock or violent motion. The second function is to allow the hearing of a telephone ringer or pager. The protective foam 18 contains cutouts to reduce the dampening of any sounds, alarms, or rings coming from any device contained within the protective case. FIG. 4A is a cross sectional view of the foam taken at lines A—A indicated in FIG. 4. The internal cutout in the foam allows the ringing of the telephone to be heard. The protective foam is located on both halves 14,15 of the protective case. When the protective case is in the closed position the telephone is sandwiched between the two pieces of foam. The foam compresses to allow for closure of the unit. The result is the firm grasp of the telephone within the unit. The foam serves to protect the telephone while the cutouts allow for the operator to hear the telephone ringing inside the case.

A waterproof seal is created between halves 14,15 by means of O-ring 20. FIG. 4A shows O-ring 20 in a groove on front half 14. When halves 14 and 15 are pressed into the closed position a seal is established by compressing 0-ring 20. The result of the seal is a protective case that will not allow the penetration of water into the hollow portion of the case. Also resulting from the seal is a case which will float if placed or dropped into a large body of water.

Figure 5A:
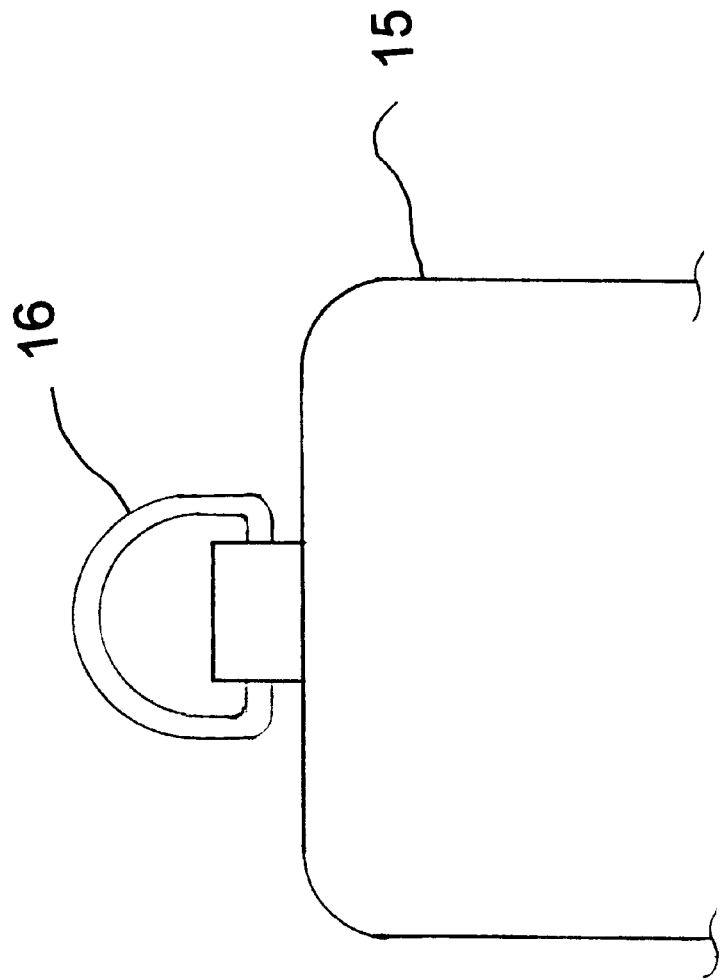
FIG. 5A is a direct view of a D-hook.

FIG. 5 is a side view of a protective equipment case shown in FIG. 2. Visible is D-Hook 16 (also visible in FIG. 5A) which is attached at the top of the unit. The D-hook is mounted by being directly molded into the material of rear half 15. This is one means of mounting the D-hook. Other mechanical and chemical fastening measures are available and are within the scope of this invention.

Figure 6:
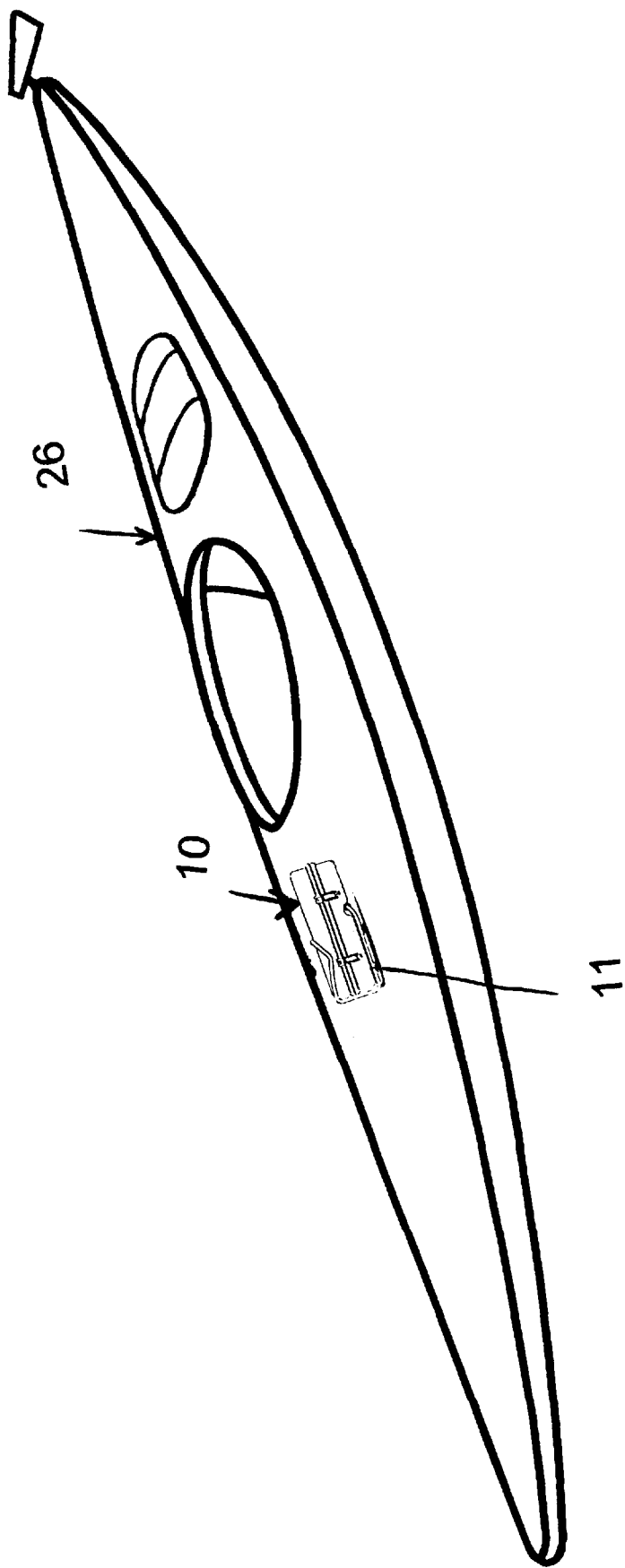
FIG. 6 is a general view of the protective case mounted to a boat.

FIG. 6 shows an embodiment of the protective case mounted on a small boat. The protective case 10 is secured by the standard bicycle water bottle cage 11 which is mounted to a boat 26 by either a mechanical fastener or a chemical adhesive.

Figure 7:
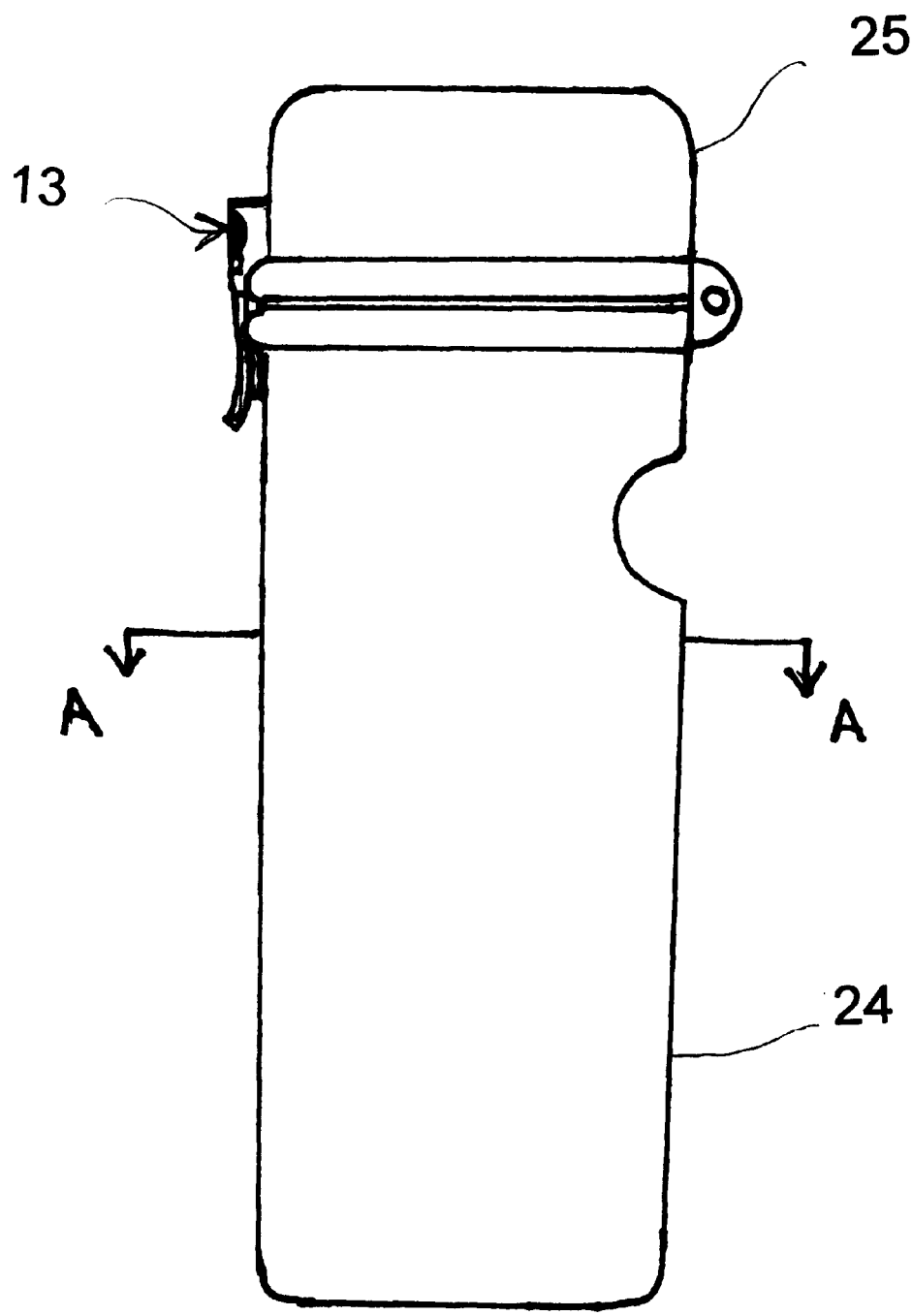
FIG. 7 is a side view of the hinged top embodiment of the protective case.
Figure 7A:
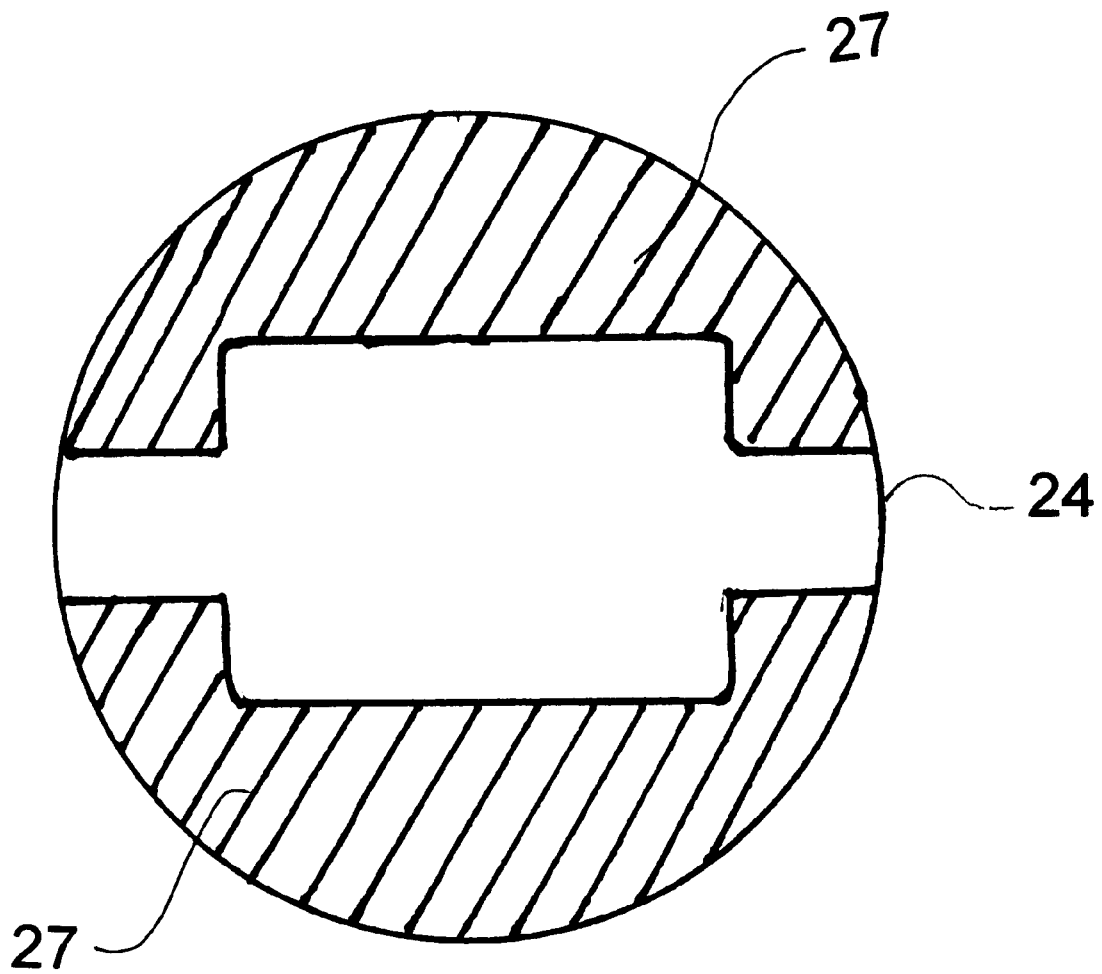
FIG. 7A is a top sectional view of the interior foam used in the embodiment shown in FIG. 7.

FIG. 7 shows an embodiment of the protective case which provides access to the interior of the hollow cylinder 24 by means of a hinged cap 25. The telephone or other equipment is inserted by opening the hinged cap and sliding the telephone in between the foam inserts 27 shown in FIG. 7A. The foam inserts contain a gap capable of allowing the telephone to be inserted between the two pieces. The foam provides compression to stabilize and protect the contents. The hinged cap 25 is secured by snap closure 13.

Figure 8:
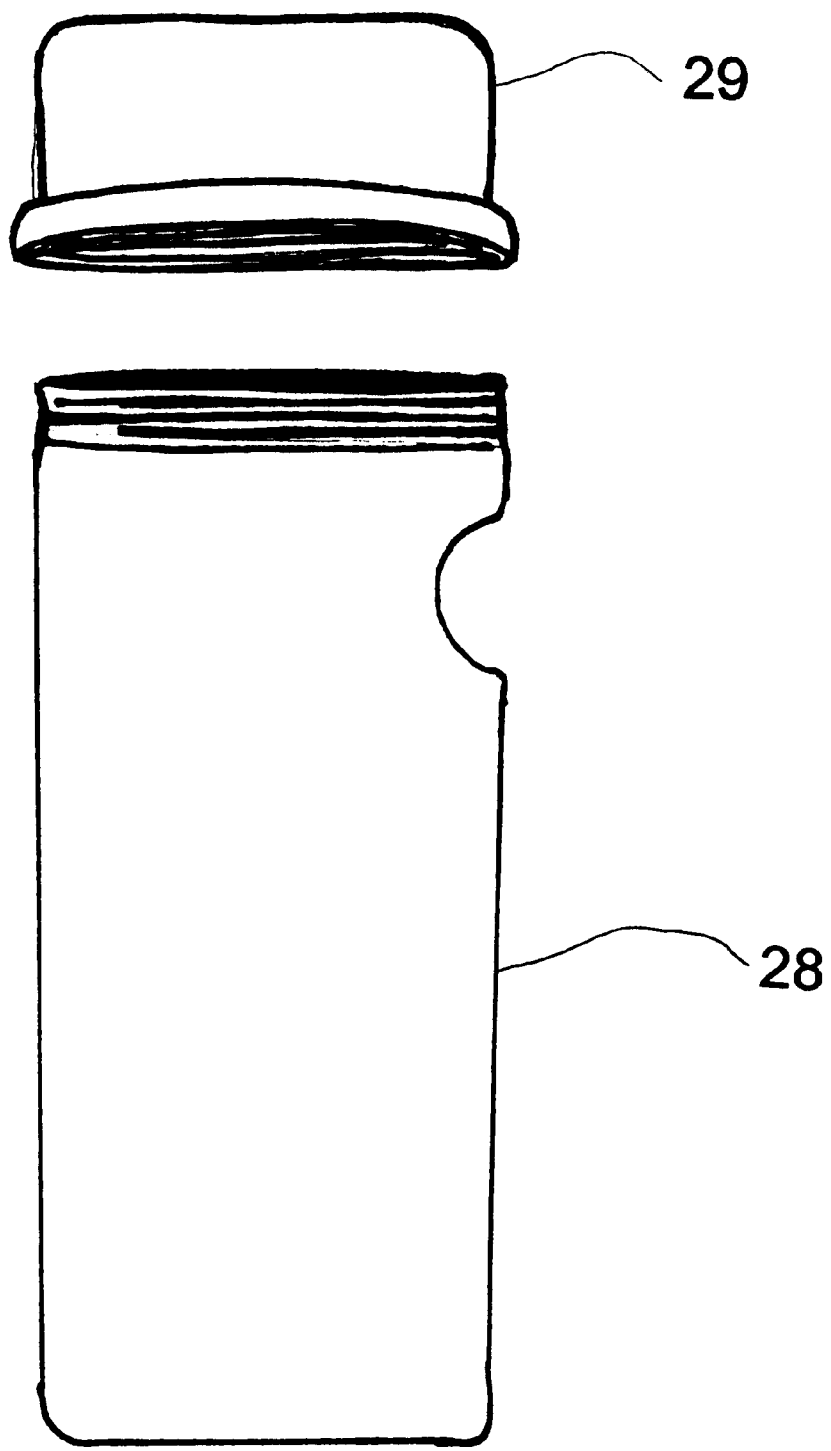
FIG. 8 is a side view of the screw top embodiment of the protective case.

FIG. 8 shows an embodiment of the protective case wherein the case is comprised of a threaded cylinder 28 and a threaded cap 29. Said cap is a screw top type lid, which mounts directly to the top of the cylinder. The screw top lid contains a seal or gasket to provide a water tight seal when in the closed or assembled position. The interior of this embodiment is similar to the embodiment described in FIG. 7 and FIG. 7A.

Figure 9:
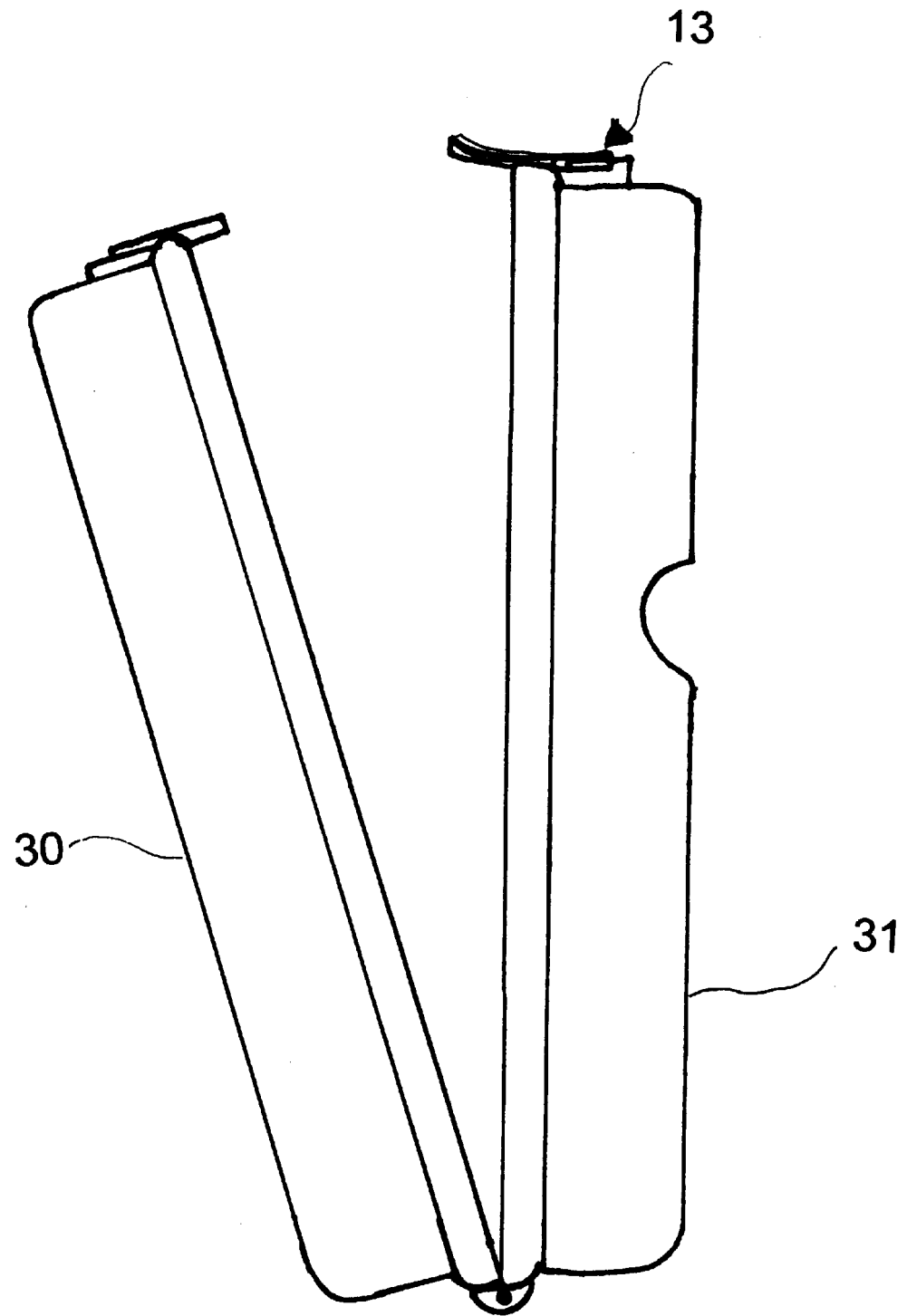
FIG. 9 is a side view of the bottom hinge embodiment of the protective case.

FIG. 9 shows an embodiment of the protective case wherein the two cylinder halves 30, 31 are connected via a hinge along the bottom of the cylinder and snap closure 13 at the top.

Figure 10:
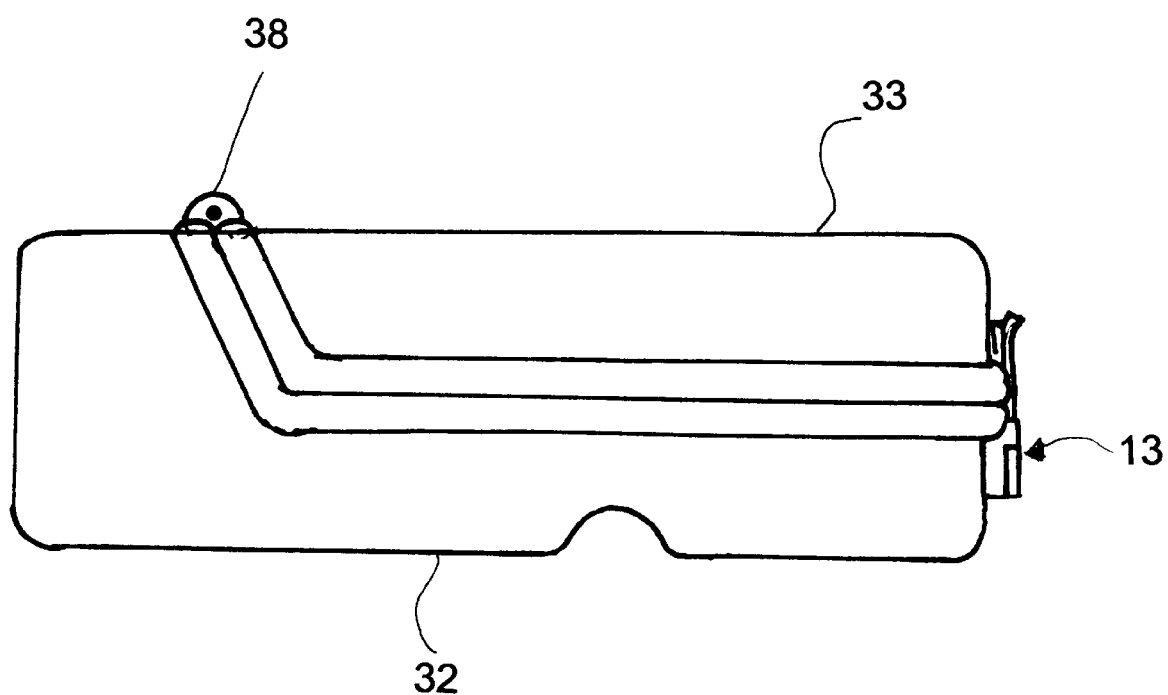
FIG. 10 is a side view of the split cylinder embodiment of the protective case.

FIG. 10 shows an embodiment of the protective case wherein the case is comprised of two pieces 32, 33, which when in the closed position form a complete cylinder with capped ends. The main portion of the cylinder 32 is attached via hinge 38 to the smaller portion 33. The larger piece 32 contains a complete cylinder at its base.

Figure 11:
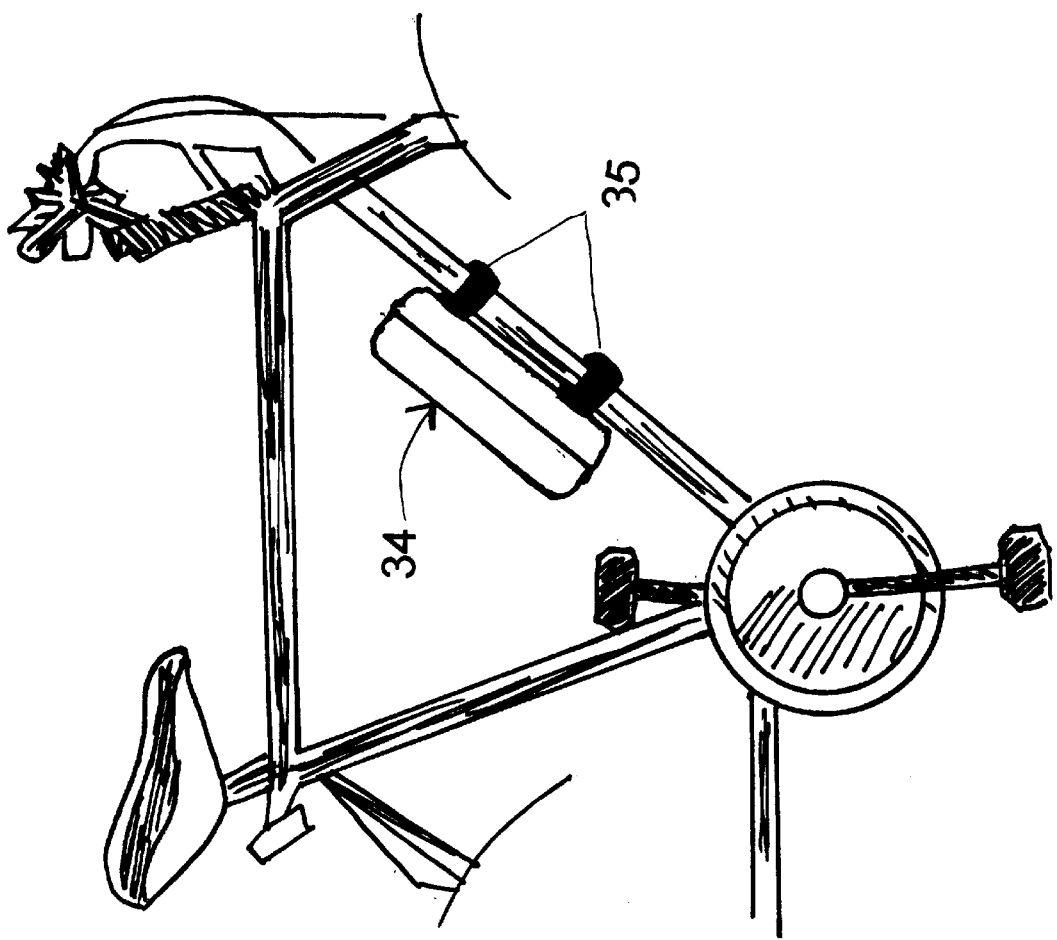
FIG. 11 is a side view of the direct strap mount embodiment of the protective case.
Figure 11A:
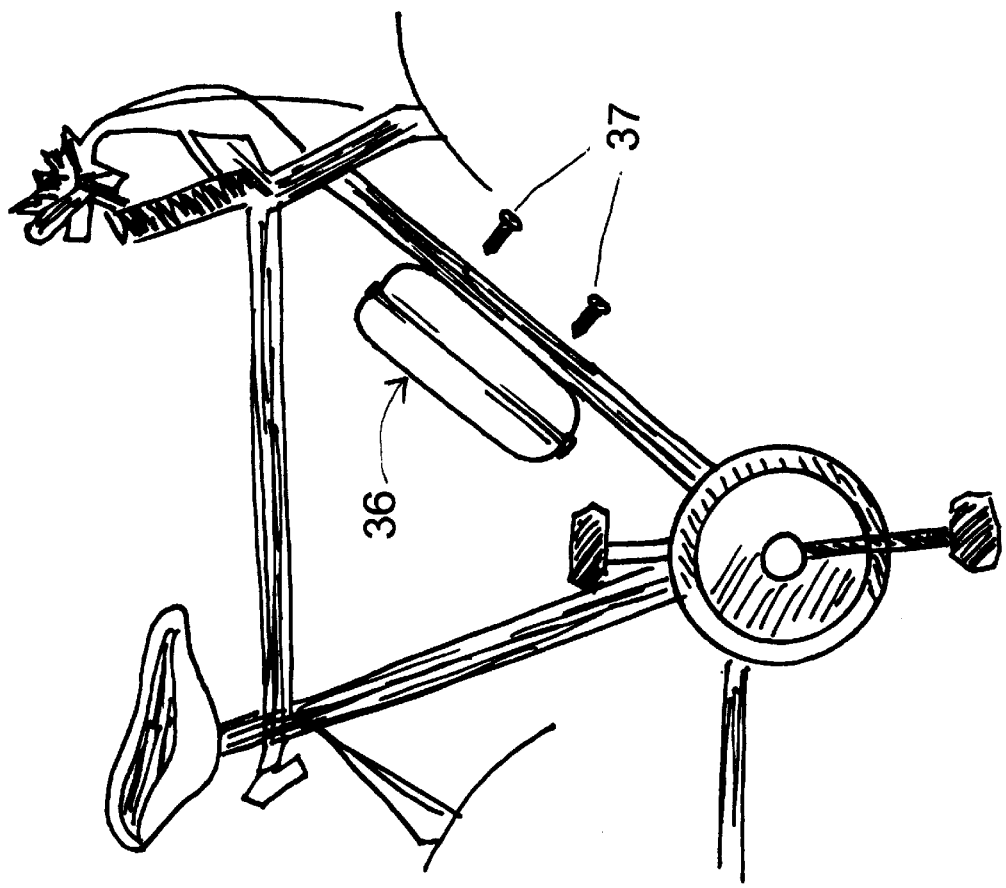
FIG. 11A is a side view of a bottom piece of a screw mount embodiment of the protective case.

FIG. 11 shows an embodiment of the protective case wherein the case is mounted directly to the bicycle without the aid of the standard bicycle water bottle cage. The case 34 contains provision to mount by the use of straps 35, which attach to the bicycle frame or any other similarly sized pole or beam. FIG. 11A shows another method of attaching directly to the bicycle or boat without the aid of the standard bicycle water bottle cage. The bottom of the case 36 is equipped with mounting screws 37. The case can be attached by screws to any desired surface. The screw holes can be made watertight by use of O-rings, gaskets, or a chemical sealant.

This specification is directed to but not limited to the protection of wireless telephones. The protective case can be used to protect any items small enough to be placed inside. The surface area of the case is designed to allow for the printing of any operational instructions or promotional advertising.

OPERATION OF INVENTION

The protective equipment case of the invention is intended to be used for the protection of wireless telephones or other equipment that can be stored inside the case. Operation consists of opening the unit by means of unlatching latch 13 (see FIG. 2), and opening the case by means of pivoting along hinge (see FIG. 4). A telephone or other equipment is placed inside the hollow portion of the case, in such a manner that the closing of the case will secure the telephone or equipment between two pieces of protective foam 18. Of which one piece of the foam 18 is firmly attached to each of the two halves of the unit 14,15 (see FIG. 2).

The closed unit is secured shut by closing latch 13 (FIG. 2). The closed unit is then placed into a standard bicycle water bottle cage 11, which firmly holds the unit by means of indentation 17 (see FIG. 2). The closed unit provides a waterproof seal to protect the unit from weather, shock, dirt, water, and any other environmental hazard.

When the bicycle operator needs to use the telephone the case can quickly be opened to allow access to the telephone. If someone else is trying to reach the bicycle operator, the telephone in the case will ring. The operator will hear the ring due to the acoustically permeable characteristics of protective foam 18. The operator can quickly stop the bicycle, remove the protective case from the standard water-bottle cage 11, and retrieve the telephone by opening the case.

When the protective case is not needed for use on a bicycle, a tether or carry strap can be attached to D-Hook 16.

The protective case is also designed to allow for the printing of graphics on the external surfaces. This graphic space can be used for operating instructions and for promotional advertising.

The invention has been described with respect to use with a bicycle. It can also be used with a boat, to which a standard bicycle water-bottle holder has been mounted. This is shown schematically in FIG. 6, where the cage 11 is shown mounted to boat 26.

The invention when in the closed position will protect its contents from physical damage caused by shock or impact while simultaneously permitting any alarm, ringer, or beeper contained within to be heard by a human operator. The protective case in the closed position will create a decibel differentiation of 12 decibels. Thus any device emitting greater than 13–14 decibels will be audible through the closed case. The protective case in the closed position will protect the contents from the acceleration and shock generated by a standard 6 feet drop test.

SUMMARY

Thus the Protective Equipment Case provides a unique and effective solution to the problem of protection and convenience of using a mobile telephone while on a bicycle or a boat. The invention allows for increased safety of bicycle or boat users by providing a means for the bringing of the mobile telephone with them on any bicycle or boat trip. The operator has the means to place an emergency call from any point on their trip. Further more the protective case has additional advantages in that it provides an economical solution to the protection of expensive electronics in hostile environments;

it allows the user to protect the telephone while not on the bicycle or boat by means of a D-hook which can attach to a variety of shoulder straps and tethers;

it provides an excellent media for advertising by the manufacturer;

it provides an excellent media for the listing of operating instructions of any device that may be contained within;

it provides a solution that is easily compatible with all bicycles and boats already in existence; and it provides a solution that is compatible with a large variety of mobile telephones and similarly sized electronic devices already in existance.

While the above description contains many specifications, these should not be construed as limitations on the scope of the invention, but rather as an exemplification of one preferred embodiment thereof Many other variations are possible. For example the case can be sized on the inside to accommodate any equipment desired to be carried and protected. The outside shape of the case may be any shape that facilitates securing in a bicycle water bottle mount, such as a cage. Forms of bicycle water bottle mounts other than the standard cage can be used. These include mounts that use side clamps, friction, hook and loop fastener, or any other that are subsequently developed. Rather than using a standard water bottle cage, a support more specifically designed for use with a protective case can be used. The means by which the case is constructed, hinged, sealed against moisture may be any suitable means known to the art.

Accordingly, the scope of the invention should be determined not by the embodiment(s) illustrated, but by the appended claims and their legal equivalents.

Having described the invention, what is claimed is:

1. A protective container for holding a mobile/cellular telephone, said container adapted to be attached to a bicycle water bottle holder having a base support and opposing first and second supports extending from the base support, said container comprising:

first and second distinct portions, each said portion having a mating surface;

a hinge which hinges said first and second portions together allowing each said mating surface to mate together in a closed configuration, wherein, when mated together, said distinct portions form a capped hollow cylinder;

a fastener that fastens said distinct portions together when said mating surfaces are mated together; said mating surfaces further including an O-ring therebetween;

a shock and vibration dampening foam cushioning located inside said hollow container, wherein when said first and second distinct portions are placed in said closed configuration, said foam cushioning sandwiching the telephone in said container to hold and maintain the telephone substantially motionless relative to said container;

one of said distinct portions including an indentation, wherein said container is configured to be placed within the water bottle holder with one of the first and second supports engaging said indentation for holding said container within the water bottle holder.

2. The container of claim 1 wherein said container includes a hook which allows attachment of a tether or a carrying strap.

3. The container of claim 1 wherein said foam cushioning comprising spaced apart pieces of foam which define regions therebetween with no foam, said pieces of foam holding the telephone inside said container away from interior surfaces thereof, said regions that contain no foam permitting transmission therethrough of the ringing of the telephone, thus increasing the audibility of the ringing of the telephone when the telephone is inside said container in said closed configuration.

4. The container of claim 1 wherein the foam cushion comprising a material which protects the telephone from shock equivalent to or less than a six foot drop of said container in said closed configuration.

5. The container of claim 1 wherein said container, in said closed configuration and containing a telephone therein, is floatable in water.

6. The container of claim 1 wherein said foam cushioning is compressible.

* * * * *